United States Patent
Hong et al.

(10) Patent No.: US 11,557,776 B2
(45) Date of Patent: Jan. 17, 2023

(54) HEAT MANAGEABLE FUEL CELL HOT BOX

(71) Applicant: UIF (University Industry Foundation), Yonsei University, Seoul (KR)

(72) Inventors: Jong Sup Hong, Seoul (KR); Ji Young Kim, Seoul (KR); Woo Seok Lee, Seoul (KR); Dong Young Yoon, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/363,696

(22) Filed: Jun. 30, 2021

(65) Prior Publication Data

US 2022/0006107 A1 Jan. 6, 2022

(30) Foreign Application Priority Data

Jul. 1, 2020 (KR) .................. 10-2020-0081197

(51) Int. Cl.
*H01M 8/04014* (2016.01)
*H01M 8/243* (2016.01)
*H01M 8/0612* (2016.01)

(52) U.S. Cl.
CPC ..... *H01M 8/04022* (2013.01); *H01M 8/0618* (2013.01); *H01M 8/243* (2013.01)

(58) Field of Classification Search
None
See application file for complete search history.

(56) References Cited

U.S. PATENT DOCUMENTS

| 5,741,605 A | * | 4/1998 | Gillett | ................. H01M 8/2428 |
| | | | | 429/456 |
| 5,750,278 A | * | 5/1998 | Gillett | ................. H01M 8/247 |
| | | | | 429/163 |
| 8,968,958 B2 | | 3/2015 | Gottmann et al. | |
| 9,799,902 B2 | | 10/2017 | Weingaertner et al. | |
| (Continued) | | | | |

FOREIGN PATENT DOCUMENTS

| EP | 3998228 A1 * | 5/2022 |
| JP | 5513383 B2 | 6/2014 |
| (Continued) | | |

*Primary Examiner* — Haroon S. Sheikh
(74) *Attorney, Agent, or Firm* — Tarolli, Sundheim, Covell & Tummino LLP

(57) ABSTRACT

A fuel cell hot box for improving the system efficiency of a fuel cell. Fuel cell stack parts, an after burner, a reformer, an air pre-heating zone, and a fuel-heat exchanger are provided in a housing allowing heat of the fuel cell stack parts and heat of combustion gas generated in the after burner to be used for reforming, preheating fuel and preheating air at the same time to avoid wasting energy. The fuel cell stack parts under thermal stress can be cooled to improve durability of the stack parts to increase a lifetime of a total system, and the stack parts can share the central chamber part to simplify a structure of the fuel cell hot box. In addition, the reformer includes an opening and closing unit to properly distribute the high-temperature combustion gas so that a reforming ratio is adjustable according to an operating condition of the fuel.

7 Claims, 8 Drawing Sheets

(56) References Cited

U.S. PATENT DOCUMENTS

2005/0164051 A1* 7/2005 Venkataraman .... H01M 8/2432
429/495
2012/0171584 A1* 7/2012 Weingaertner .... H01M 8/04014
429/408

FOREIGN PATENT DOCUMENTS

KR 20090086008 A 8/2009
KR 20190036996 A 4/2019

* cited by examiner

HEAT MANAGEABLE FUEL CELL HOT BOX

This application claims priority to and the benefit of Korean Patent Application No. 10-2020-0081197, filed on Jul. 1, 2020, the disclosure of which is incorporated herein by reference in its entirety.

BACKGROUND

1. Field of the Invention

The present invention relates to a fuel cell hot box for improving system efficiency through effective heat distribution and exchange.

2. Discussion of Related Art

A solid oxide fuel cell (SOFC) operating at a temperature of 700° C. or more is a fuel cell in which a solid oxide (ceramic) is used as an electrolyte having oxygen ion conductivity and can use various hydrocarbon fuels, such as natural gas, liquefied petroleum gas (LPG), propane, and butane, and biofuels as well as hydrogen as fuel.

An SOFC power generation system includes a balance of plant including a power converter, a blower and a pump for supplying reactants, a heat recovery system, and a control system in addition to a fuel cell stack. Accordingly, in order to improve efficiency of the SOFC power generation system, it is very important to design a system for insulation and heat management in addition to improving performance of system components such as a fuel reformer and a power converter in addition to the stack.

In the SOFC power generation system, heat is generated in the fuel cell stack, an after burner, a heating reformer, and the like. Conversely, a steam reformer, a vaporizer, an air preheater, a fuel preheater, and a hot water generator require heat. Accordingly, designing a proper heat exchanging network to minimize heat loss, through calculating an amount of heat generated and needed in the system, greatly affects a total efficiency of the SOFC system. For efficient heat management of the SOFC system, it is important to supply heat needed to maintain a temperature of the stack, to pre-heat and to reform fuel, and the like by using heat generated in the stack and obtained by combusting unreacted fuel when the SOFC system operates.

As described above, the SOFC system has an advantage of high system efficiency, freedom of fuel selection, or the like. However, since the SOFC system is operated at a high temperature of 700° C. or more, there are problems in that suitable components for such an operating environment are necessary, but manufacturing and maintenance costs of such components are high. In addition, such a high-temperature operating environment is accompanied by a problem of degrading reliability of performance and durability in the long-term due to high deterioration rates of the components.

RELATED ART

Patent Document

Unexamined Patent Publication No. 10-2009-0086008 (Aug. 10, 2009)

SUMMARY OF THE INVENTION

Therefore, the present invention is directed to providing a solid oxide fuel cell hot box of which durability is improved in the long-term by arranging an air pre-heating zone and a reformer to effectively preheat low-temperature fuel and air using high-temperature heat of a fuel cell stack part and combustion gas, by exchanging heat through the air pre-heating zone and the reformer to improve system efficiency, and by effectively cooling the fuel cell stack part to reduce a thermal gradient at the same time.

According to an aspect of the present invention, there is provided a fuel cell hot box including a housing including a first inner space, a first inlet, a second inlet, and an outlet, a central chamber part which is positioned in a central portion of the first inner space and includes a second inner space, an after burner, and a reformer, a plurality of fuel cell stack parts which are positioned at the same distance from a center of the central chamber part and are arrayed to be spaced apart from each other at predetermined intervals in the first inner space, and an air pre-heating zone provided between the plurality of fuel cell stack parts and the central chamber part, wherein, in the central chamber part, the after burner is provided at one side portion on a vertical central axis of the central chamber part, and the reformer is provided at the other side portion on the vertical central axis.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 9 is a flowchart illustrating the moving paths of the fuel, air, and combustion gas according to one embodiment of the present invention.

DETAILED DESCRIPTION OF EXEMPLARY EMBODIMENTS

Since the present invention, which will be described below, may have various changes and embodiments, specific embodiments will be illustrated in the accompanying drawings and described in detail. However, this is not intended to limit the present invention to the specific embodiments, and it is to be appreciated that all changes, equivalents, and substitutes that fall within the spirit and technical scope of the present invention are encompassed in the present invention.

According to an aspect of the present invention, there is provided a fuel cell hot box that includes a housing including a first inner space, a first inlet, a second inlet, and an outlet, a central chamber part which is positioned in a central portion of the first inner space and includes a second inner space, an after burner, and a reformer, a plurality of fuel cell stack parts which are positioned at the same distance from a center of the central chamber part and arrayed to be spaced apart from each other at predetermined intervals in the first inner space, and an air pre-heating zone provided between the plurality of fuel cell stack parts and the central chamber part, wherein, in the central chamber part, the after burner is provided at one side portion on a vertical central axis of the central chamber part, and the reformer is provided at the other side portion on the vertical central axis.

As one embodiment of the present invention, the first inlet may be connected to the reformer, the second inlet may be connected to the air pre-heating zone, and the outlet may communicate with the second inner space.

As one embodiment of the present invention, a through hole passing through a central portion of the reformer may be formed, and a bent flow path surrounding the through hole may be formed in a stacked form to allow introduced fuel to flow.

As one embodiment of the present invention, the reformer may further include an opening and closing unit in an upper portion of the reformer.

As one embodiment of the present invention, the opening and closing unit may include a control rod protruding outward from the housing.

As one embodiment of the present invention, the reformer may be disposed between and connect the first inlet and the plurality of fuel cell stack parts.

As one embodiment of the present invention, the air pre-heating zone may include a bent flow path that is stacked and may be disposed between and connect the second inlet and the plurality of fuel cell stack parts.

In FIGS. 1 to 9, a structure of a fuel cell hot box 10 according to one embodiment of the present invention is illustrated. Hereinafter, the present invention will be described in more detail with reference to the accompanying drawings to help understanding of the present invention. However, the following embodiment is only provided to allow the present invention to be easily understood, and contents of the present invention are not limited by the following embodiment.

Figure 1:
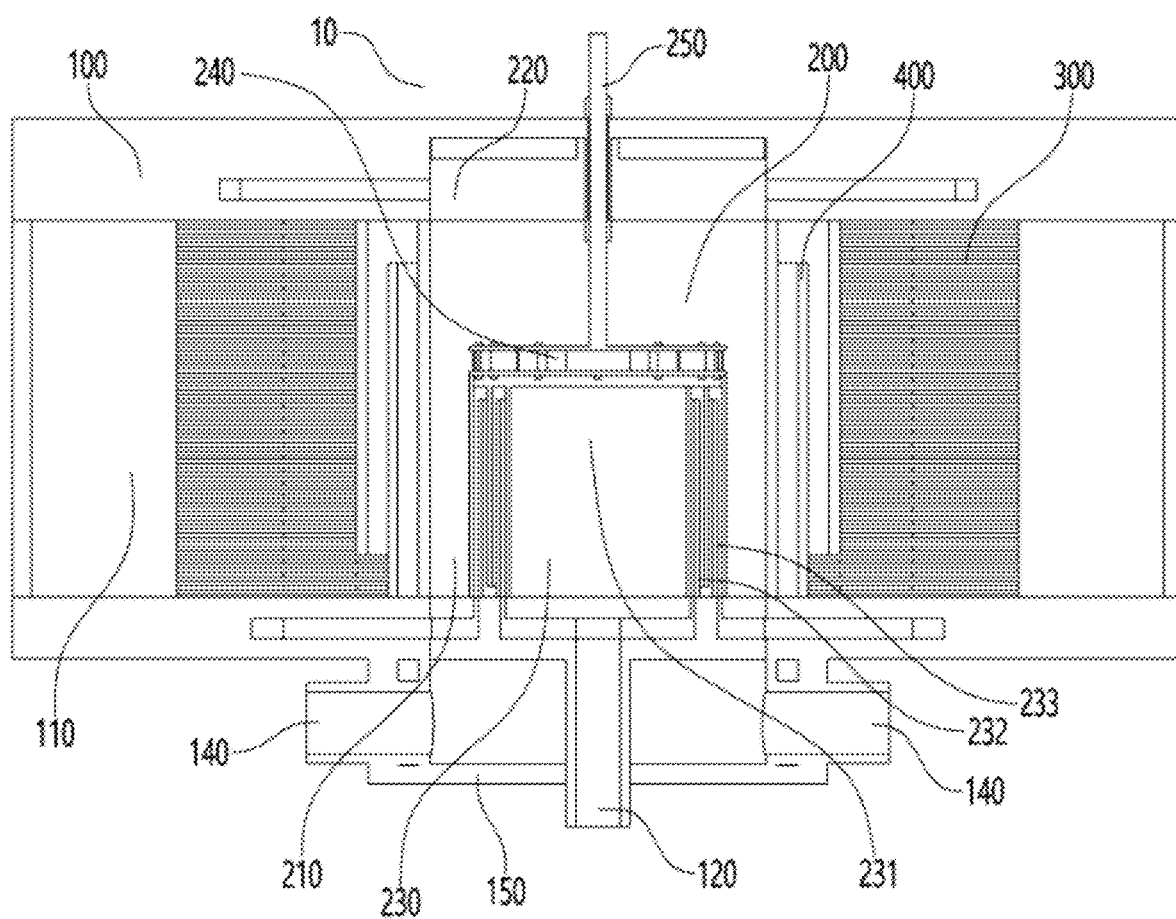
FIG. 1 is a schematic view illustrating a structure of a fuel cell hot box according to one embodiment of the present invention.

FIG. 1 is a schematic view illustrating a structure of a fuel cell hot box 10 according to one embodiment of the present invention. Referring to FIG. 1, the fuel cell hot box 10 according to the present invention includes a housing 100, a central chamber part 200, fuel cell stack parts 300, and an air pre-heating zone 400.

Figure 2:
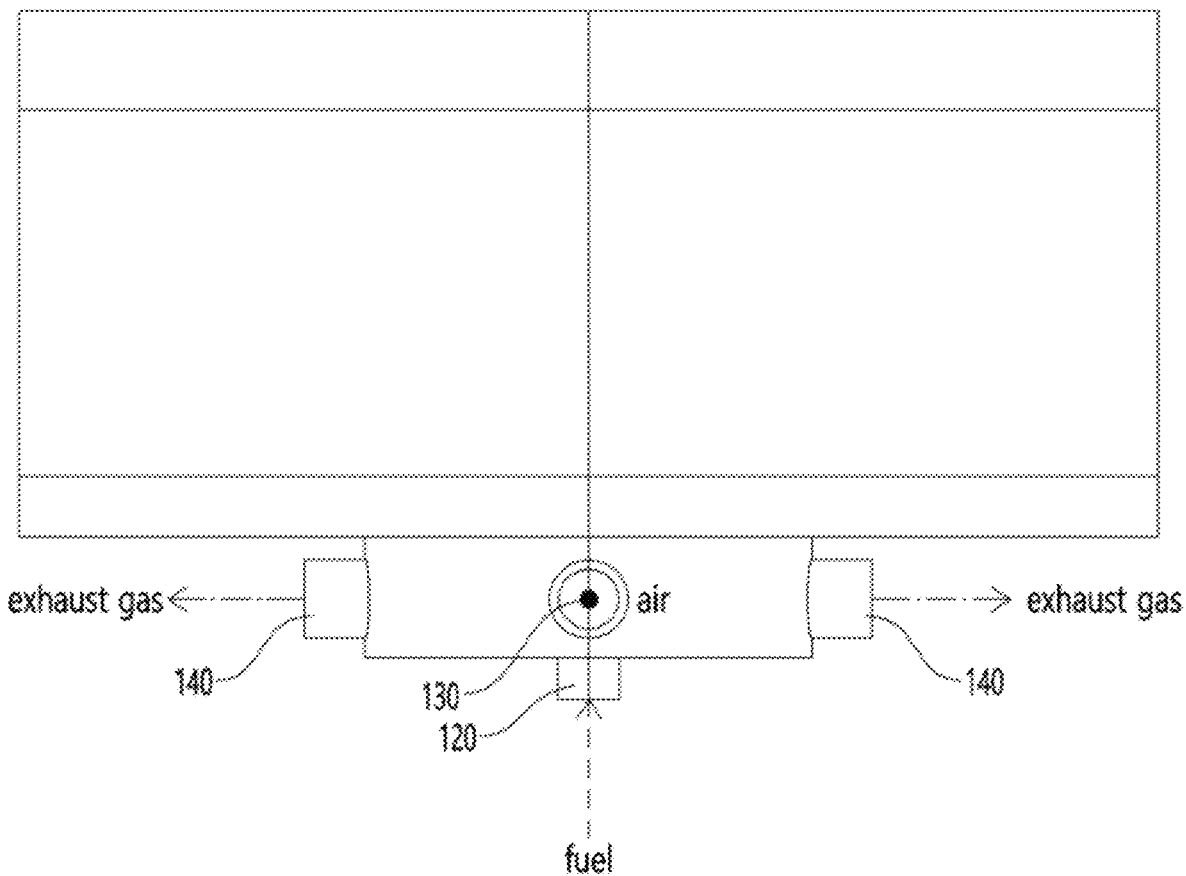
FIG. 2 is a view illustrating a side surface portion of the fuel cell hot box according to one embodiment of the present invention.

The housing 100 may be formed in a rectangular hexahedron shape. However, the housing 100 is not limited thereto and may be formed in one of various shapes such as a square hexahedron shape, a rectangular hexahedron shape, and a cylindrical shape. As illustrated in FIGS. 1 and 2, a first inner space 110, a first inlet 120, a second inlet 130, and an outlet 140 may be formed in the housing 100. An insulating layer may be formed on an inner side surface of the housing 100. The insulating layer may be formed of a heat-resistant material to prevent damage from a high-temperature.

As one specific embodiment, the first inlet 120, the second inlet 130, and the outlet 140 may be formed in a flow chamber 150 formed to be stepped from a lower surface of the housing. The flow chamber 150 may be a space in which the gas introduced through the first inlet 120 and the air introduced through the second inlet 130 can exchange heat with the combustion gas flowing out through the outlet 140.

The cross-section of the flow chamber 150 may be formed in various shapes, such as a circle, a square, etc. having a size smaller than the size of the lower surface of the housing.

The first inner space 110 is a space formed by an inner portion of the housing 100 and provides a space in which the central chamber part 200, the stack part 300, and the air pre-heating zone 400 are accommodated and the first internal space 110 provides a space in which unreacted air and unreacted fuel which pass through the stack part 300 move to an inlet (not shown) of the after burner 220. The first inner space 110 may be formed in one of various shapes according to shapes and a layout of the central chamber part 200, the fuel cell stack part 300, and the air pre-heating zone 400. For example, the first inner space 110 may be formed as a hexahedral space but is not limited thereto.

The first inlet 120 may be formed in the flow chamber 150 formed on the lower surface of the housing 100 and is connected to a reformer unit 232 of a reformer 230 to communicate with the outside of the housing 100. Through the first inlet 120, needed fuel for the fuel cell is introduced, such as methane, gasoline, biogas, methanol, or ethanol in addition to hydrogen. The first inlet 120 may be provided as a plurality of first inlets 120 according to the number, capacity, and arrangement of the fuel cell stack parts 300, and in this case, the first inlets 120 may be provided to have different shapes and sizes. A fuel supply device for effectively injecting fuel may be connected to the first inlets 120.

The second inlet 130 may be formed in the flow chamber 150 formed on the lower surface of the housing 100 and be connected to the air pre-heating zone 400 to communicate with the outside of the housing 100. The second inlet 130 is an inlet through which air used in the fuel cell is introduced. The second inlet 130 may be provided as a plurality of second inlets 130 according to the number and capacity of the fuel cell stack parts, and in this case, an air supply device may be connected to each of the second inlets 130 to effectively inject the air.

The outlet 140 may be formed in the flow chamber 150 formed on the lower surface of the housing 100 and the outlet 140 is connected so that the outside of the housing 100 communicates with a second inner space 210 and a through hole 231. The second inner space 210 is formed in the central chamber part 200, excluding the after burner 220 and the reformer 230 in which the through hole, and the outlet 140 assists combustion gas generated in the after burner 220 passing through the second inner space 210 and the through hole 231 to be discharged to the outside of the housing 100. The outlet 140 may be provided as a plurality of outlets 140 according to the number and capacity of the stack parts 300 and a capacity of the after burner 220, and in this case, the outlets 140 may be connected to a combustion gas discharge apparatus to effectively discharge the combustion gas. The second inlet 130 and the outlet 140 may be positioned close to each other or positioned at opposite sides at the flow chamber 150.

As one specific embodiment, as illustrated in FIGS. 1 and 2, the plurality of outlets 140 may be formed in side surface portions of the flow chamber 150 to face each other about the flow chamber 150, and the second inlet 130 may be formed in the side surface portion of the flow chamber 150 in a direction perpendicular to the direction of the outlet 140.

Figure 3:
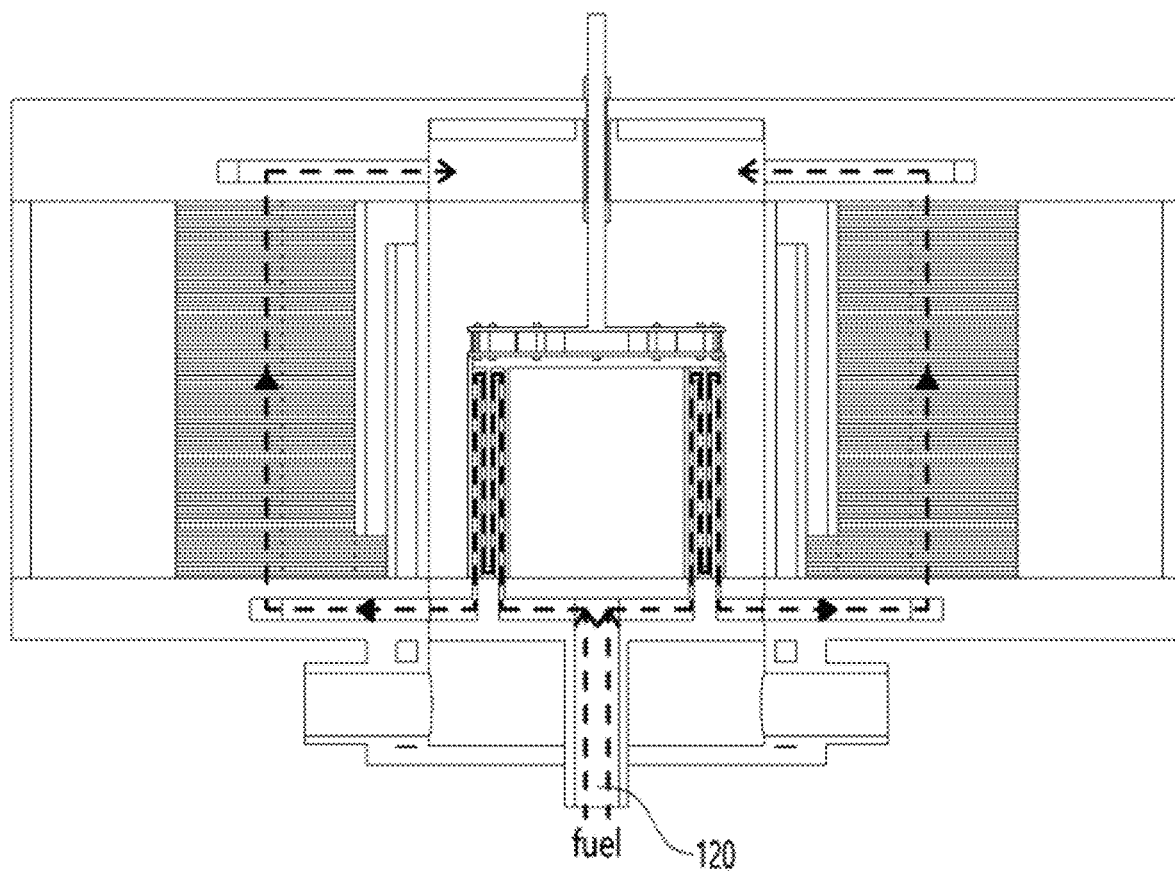
FIG. 3 is a view illustrating a moving path of fuel introduced into the fuel cell hot box according to one embodiment of the present invention.

As another specific embodiment, as illustrated in FIG. 3, the first inlet 120 may be formed in a lower surface of the flow chamber 150. Fuel introduced through the first inlet 120 passes through the reformer 230 and is introduced into the fuel cell stack parts 300, and the fuel passing through the fuel cell stack parts 300 is introduced into the after burner 220 and burned with air.

Figure 4:
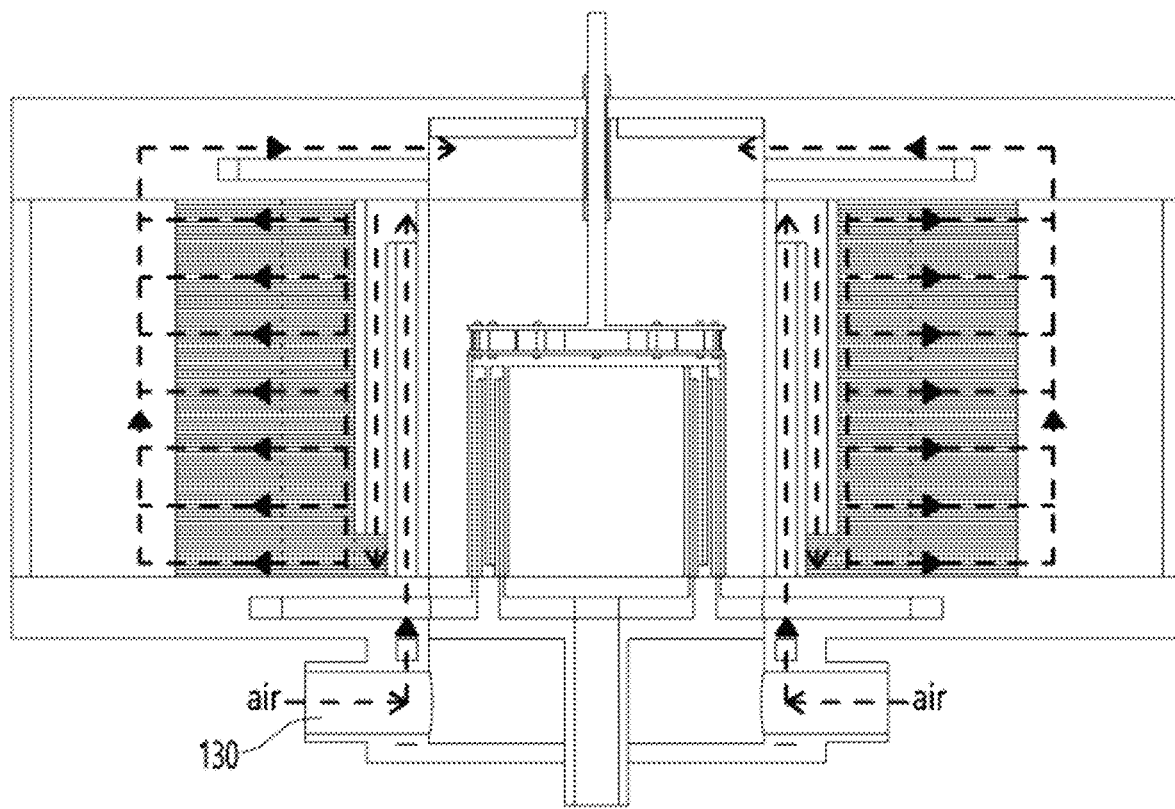
FIG. 4 is a view illustrating a moving path of air introduced into the fuel cell hot box according to one embodiment of the present invention.
Figure 5:
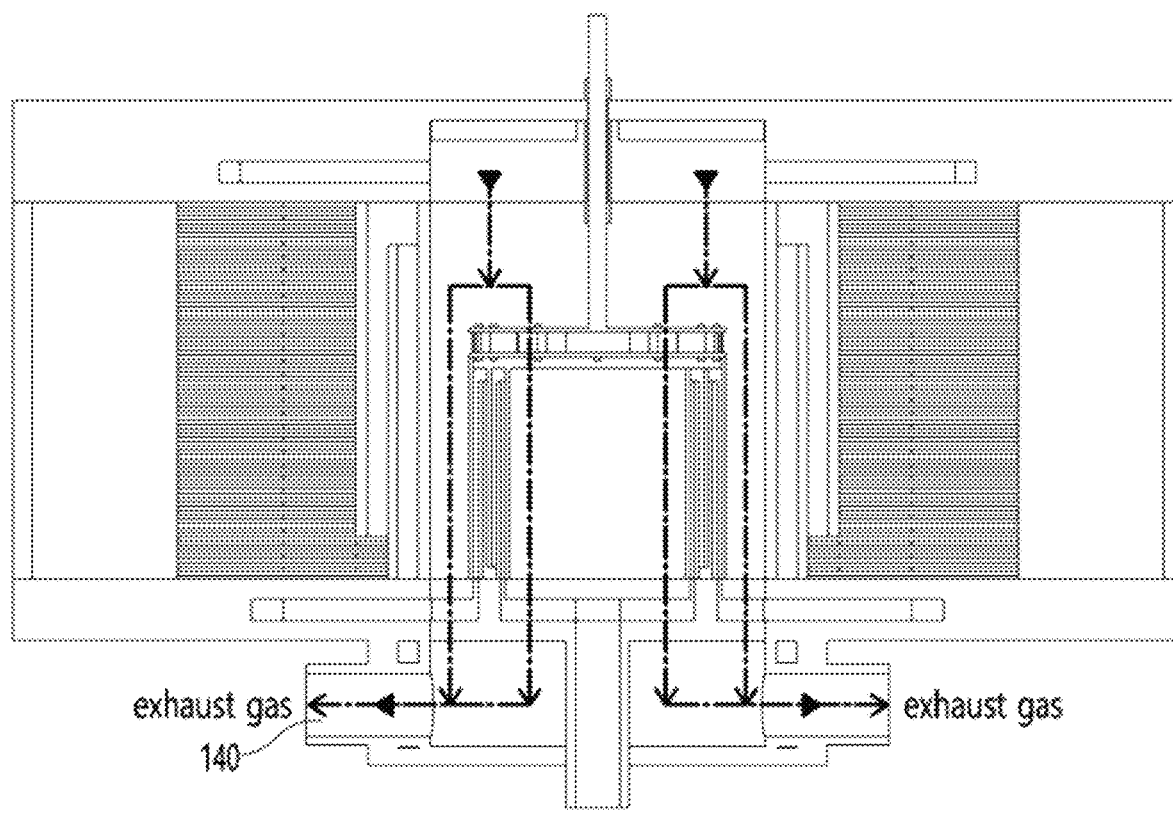
FIG. 5 is a view illustrating a moving path of combustion gas generated in the fuel cell hot box according to one embodiment of the present invention.
Figure 6:
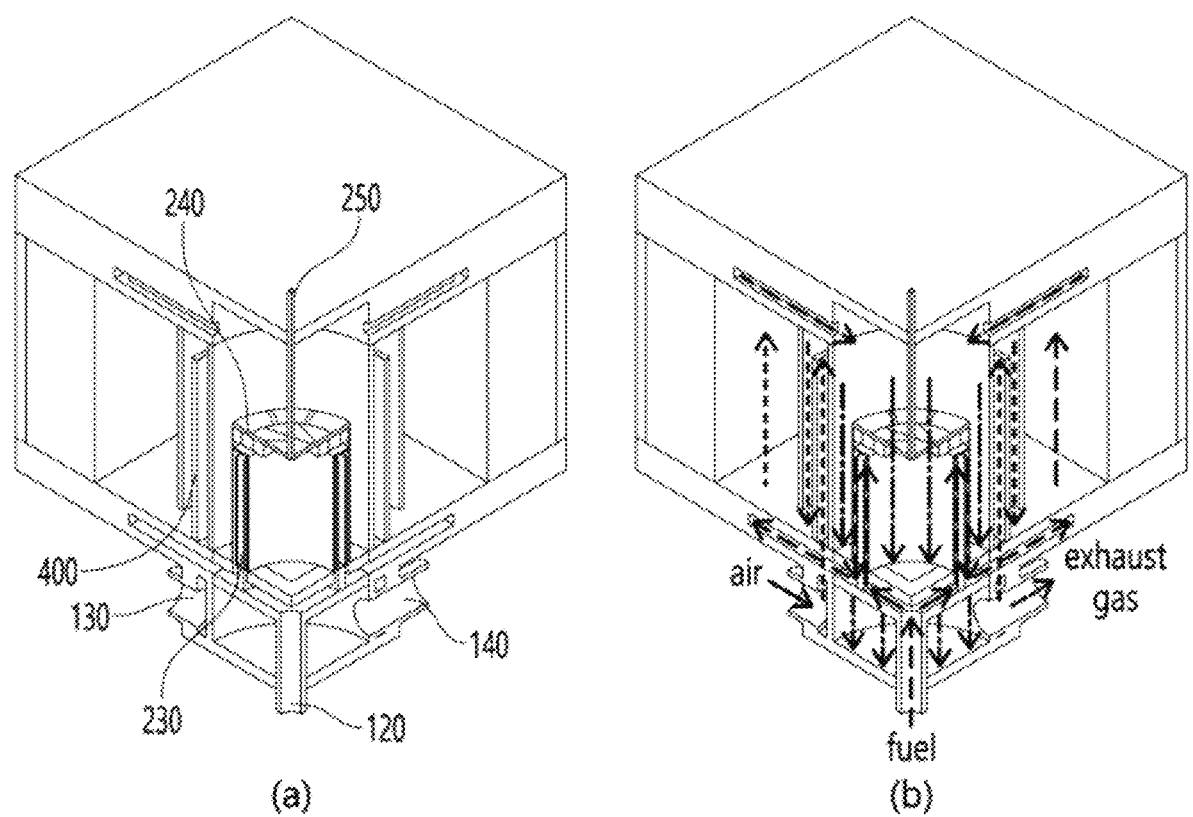
FIG. 6 shows a half cross-sectional view (see FIG. 6A) illustrating a shape in which the fuel cell hot box according to one embodiment of the present invention is cut by ¼ and a view (see FIG. 6B) illustrating the moving paths of the fuel, air, and combustion gas.

As still another specific embodiment, as illustrated in FIGS. 4 to 6, the plurality of second inlets 130 may be formed to face each other about the flow chamber 150, and the plurality of outlets 140 may also be formed to face each other about the flow chamber 150. Air introduced through the second inlet 130 passes through the air pre-heating zone 400, is introduced into the fuel cell stack parts 300, passes through the fuel cell stack parts 300, and is introduced into the after burner 220. When fuel and the air are burned in the after burner 220 and combustion gas is generated, the combustion gas is discharged to the second inner space 210, and some of the combustion gas passes through the reformer 230, passes through the flow chamber 150, and is discharged to the outside of the housing 100 through the outlet 140, and the remaining combustion gas is directly discharged to the outside of the housing 100 through the outlet 140.

The central chamber part 200 is positioned at a central portion of the first inner space 110, and the plurality of fuel cell stack parts 300 are disposed around the central chamber part 200. The central chamber part 200 may be formed to have one of various shapes and one of various sizes according to the capacity, size, and an arrangement of the plurality of fuel cell stack parts 300. For example, the central chamber part 200 may be formed in a cylindrical shape but is not limited thereto. In addition, the central chamber part 200 separates air and fuel introduced into the housing 100. The separated air is preheated at outside of the central chamber part 200, and the separated fuel is preheated and reformed in the central chamber part 200. The preheated and reformed fuel moves from the central chamber part 200 to the plurality of fuel cell stack parts 300. That is, the plurality of fuel cell stack parts 300 may share the central chamber part 200 and may evenly receive the reformed fuel. Since the plurality of fuel cell stack parts 300 share the central chamber part 200, an entire structure of the fuel cell hot box 10 may be simplified. In addition, the central chamber part 200 exchanges heat with the air pre-heating zone 400. A side surface portion of the central chamber part 200 may be formed of a material including a metal and the like with a high heat conductivity and heat-resistant property for heat exchanging with the air pre-heating zone 400 but is not limited thereto. In addition, the central chamber part 200 communicates with and is connected to the first inlet 120 and the outlet 140. Accordingly, fuel introduced into the housing 100 may be introduced into the reformer 230 in the central chamber part 200 through the first inlet 120, and combustion gas generated in the central chamber part 200 may be discharged to the outside of the housing 100 through the outlet 140. Since the central chamber part 200 may include the second inner space 210, the after burner 220, and the reformer 230 in one space, heat of the combustion gas generated in the after burner 220 may be used for promoting preheating and reforming of the fuel in the reformer 230.

The second inner space 210 is a space excluding the after burner 220 and the reformer 230 in the central chamber part 200 and is filled with high-temperature combustion gas discharged from the after burner 220 while the fuel cell operates. Accordingly, the combustion gas of the second inner space 210 may exchange heat with the air pre-heating zone 400 through a sidewall of the central chamber part 200 and may also exchange heat with the reformer 230. As described above, the second inner space 210 may communicate with and may be connected to the outlet 140 to discharge the combustion gas to the outside of the housing 100.

FIG. 5 is a view illustrating the schematic structure of the fuel cell hot box and a moving path of combustion gas generated in the after burner 220 according to one specific embodiment of the present invention. Referring to FIG. 5, the after burner 220 may be provided at one side portion on a vertical central axis of the central chamber part 200, and the reformer may be disposed at the other side potion on the vertical central axis. The after burner 220 may be provided in an upper portion, that is the one side portion, on the vertical central axis of the central chamber part 200 but is not limited thereto. A side surface portion of the after burner 220 communicates with the plurality of stack parts 300 through the first inner space 110, and unreacted air passing through the fuel cell stack parts 300 is introduced into the side surface portion of the after burner 220 through the first inner space 110. Unreacted fuel passing through the fuel cell stack parts 300 is introduced into the after burner 220 through a duct connecting an upper portion of the fuel cell stack parts 300 and the side surface portion of the after burner 220. In this case, since a concentration of a fuel component in the unreacted fuel and air is low due to large amounts of $CO_2$ and $H_2O$ generated in the fuel cell stack parts 300, there is a case in which complete combustion is difficult in a general combustion manner. In order to solve this, a combustion catalyst of a precious metal such as Pt and Ir may be used for promoting complete combustion of the fuel. The introduced fuel and air are burned in the after burner 220 so that high-temperature combustion gas is generated. The generated high-temperature combustion gas is discharged to the second inner space 210, promoting the preheating and there forming of the fuel and the preheating of the air, and is discharged to the outside of the housing 100 through the outlet 140 of the housing. The after burner 220 may include an apparatus for guiding the generated high-temperature combustion gas to be discharged to the second inner space 210.

The reformer 230 may be provided at the other side portion on the vertical central axis of the central chamber part 200, may be disposed in a lower portion on the vertical central axis of the central chamber part 200 but is not limited thereto, and is provided to be spaced apart from the inner sidewall of the central chamber part 200. Since the high-temperature combustion gas generated in the after burner 220 provided in an upper portion of the central chamber part 200 may be used for preheating and reforming fuel supplied from the outside of the housing 100 without additionally supplying energy, the overall efficiency of the system can be improved. The reformer 230 may include the through hole 231, the reformer unit 232, and a fuel heat-exchanging zone 233.

The through hole 231 is a hole passing through a central portion of the reformer 230 from an upper surface to a lower surface thereof and communicates with and connects the second inner space 210 and the inner space of the flow chamber 150. The through hole 231 allows combustion gas discharged from the after burner 220 to come into contact with the reformer unit 232 while the combustion gas passes through the through hole 231. The combustion gas introduced into the through hole 231 raises the temperature of the fuel in the reformer unit 232 to a temperature required for reforming.

The reformer unit 232 is a space for reforming the fuel introduced through the first inlet 120, and the reformer unit 232 surrounds the through hole 231 and is formed so that the bent flow path is repeatedly stacked. Since the form elongates a moving path of the fuel to increase a residence time, sufficient heat exchange may be performed between combustion gas introduced into the through hole 231 and fuel introduced into the reformer unit 232 to promote reforming. The reformer unit 232 may preheat the fuel as well as reforming the fuel. The reformer unit 232 connects the first inlet 120 of the housing 100 and the fuel-heat exchanging zone 233 to communicate with each other. The reformer unit 232 is disposed between and connects the first inlet 120 of the housing 100 and the fuel-heat exchanger 233 so that the first inlet 120 of the housing 100 communicates with the fuel-heat exchanger 233. A reforming catalyst which promotes a reforming reaction of fuel may be used in the reformer unit 232. The reforming catalyst may include Ni, Rh, Ru, Pt, or the like. The reformer unit 232 may be sealed except the first inlet and the fuel heat-exchanging zone 233 communicating with each other and may include a material including a metal having high a heat conductivity and heat-resistant property.

fuel heat-exchanging zone 233 is an exchanger for raising a temperature of fuel passing through the reformer unit 232 using high-temperature combustion gas of the second inner space 210 between the reformer 230 and the inner sidewall of the central chamber part 200. The fuel heat-exchanging zone 233 is formed to surround the reformer unit 232 and is connected to the reformer unit 232 allowing the fuel to pass through the reformer unit 232 and flow to the fuel heat-exchanging zone 233. The fuel heat-exchanging zone 233 is formed in the form in which a bent flow path is repeatedly stacked. Since the form elongates a moving path of fuel to increase a residence time, sufficient heat exchange may be performed between high-temperature combustion gas introduced into the second inner space 210 and fuel introduced into the fuel heat-exchanging zone 233. The second inner space 210 between the reformer 230 and the inner sidewall of the central chamber part 200 may communicate with the outlet 140 to discharge combustion gas to the outside of the housing 100. The fuel heat-exchanging zone 233 may be formed of a metal material having a high heat conductivity and heat-resistant property. Since the fuel heat-exchanging zone 233 is serially connected to the reformer unit 232, the fuel heat-exchanging zone 233 may reform the fuel. In addition, the reformed fuel passing through the fuel heat-exchanging zone 233 may exchange heat with the fuel cell stack parts 300 and the combustion gas before being introduced into the fuel cell stack parts 300.

Figure 7:
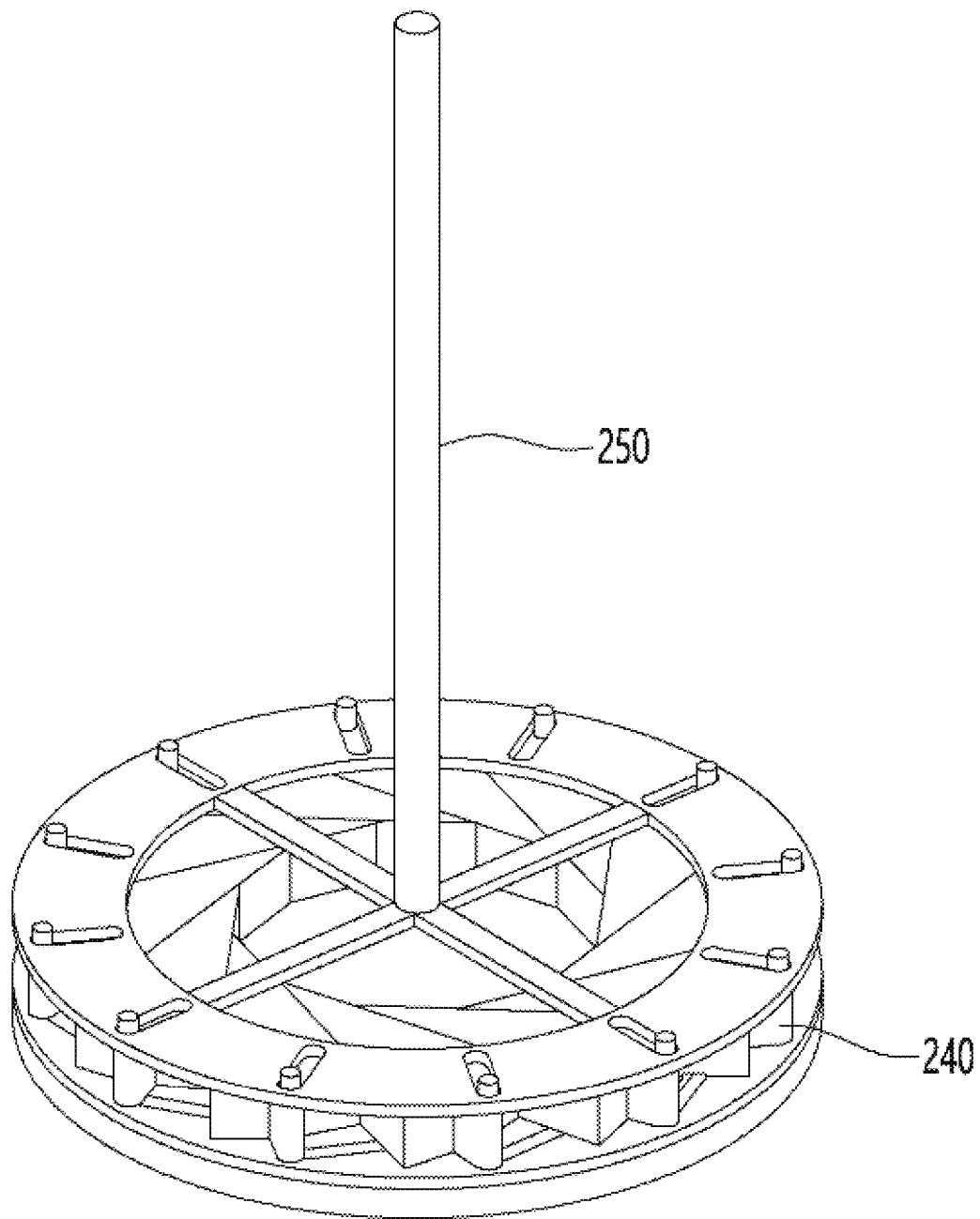
FIG. 7 is a view illustrating a schematic structure of an opening and closing unit and a control rod according to one embodiment of the present invention.

Meanwhile, FIG. 7 is a view illustrating an opening and closing unit 240 and a control rod 250 according to one embodiment of the present invention, and referring to FIG. 7, the reformer 230 may further include the opening and closing unit 240 in an upper portion thereof. The opening and closing unit 240 is a unit capable of controlling a degree of opening or closing in a mechanical manner and distributing a flow amount of combustion gas discharged from the after burner 220 to the reformer 230 and the second inner space 210 between the inner sidewall of the central chamber part 200 and the reformer 230. Accordingly, since the opening and closing unit 240 may successively control the flow amount of the combustion gas introduced into the through hole 231 of the reformer 230 through the degree of opening or closing, the opening and closing unit 240 may arbitrarily control a ratio of the combustion gas distributed to the reformer 230 and the second inner space. In addition, a reforming ratio of fuel may be flexibly controlled according to an operation state, for example, when the fuel cell becomes overheated, the opening and closing unit 240 is completely closed to stop reforming of the fuel and lower a temperature thereof, or when the power generated in the fuel cell stack is low, the opening and closing unit 240 is completely opened to promote reforming of the fuel.

In addition, the opening and closing unit 240 may include the control rod 250 capable of controlling a degree of opening or closing at the outside of the housing. The control rod 250 is built into the opening and closing unit 240 and protrudes from the housing 100. The degree of opening or closing of the opening and closing unit 240 may be controlled by operating the control rod 250.

As one specific embodiment, the control rod 250 may operate in a manner that a portion, which protrudes to the outside of the housing 100, of the control rod 250 slides in a direction perpendicular to an upper surface of the housing 100. When the control rod 250 is pressed, a degree of closing or closing of the opening and closing unit 240 may be control according to a position at which the protruding portion is inserted into the housing 100.

As another specific embodiment, the control rod 250 may operate in a manner in which the control rod 250 rotates about an axis perpendicular to the upper surface of the housing 100. A degree of closing or closing of the opening and closing unit 240 may be control according to a degree of rotation of the control rod 250.

As still another specific embodiment, the opening and closing unit 240 may operate in a manner of an aperture. The aperture may include a plurality of slidable aperture blades and control a degree of opening or closing of the opening and closing unit 240 by opening the opening and closing unit 240 from a central portion of the opening and closing unit 240 while the plurality of aperture blades slide according to a degree of control of the control rod 250.

As yet another specific embodiment, the opening and closing unit 240 may operate in a manner of a guide vane. The guide vane may include a plurality of rotatable blades and control a degree of opening or closing of the opening and closing unit 240 by opening the opening and closing unit 240 while the plurality of blades rotate according to a degree of control of the control rod 250.

As yet another specific embodiment, the opening and closing unit 240 may operate in a manner of a Venus box. The Venus box may include a plurality of laterally slidable covers and a plurality of covers which are vertically slidable along a hemispherical surface and may control a degree of opening or closing of the opening and closing unit 240 by opening the opening and closing unit 240 while the plurality of covers laterally and vertically slide along the hemispherical surface according to a degree of control of the control rod 250.

Meanwhile, since the control rod 250 protrudes outward from the housing 100, there is a risk that combustion gas present in the second inner space 210 leaks to the outside of the housing 100. Accordingly, the control rod 250 may include a heat-resistant sealing member to seal the housing so that leaking of the combustion gas may be minimized.

Figure 8:
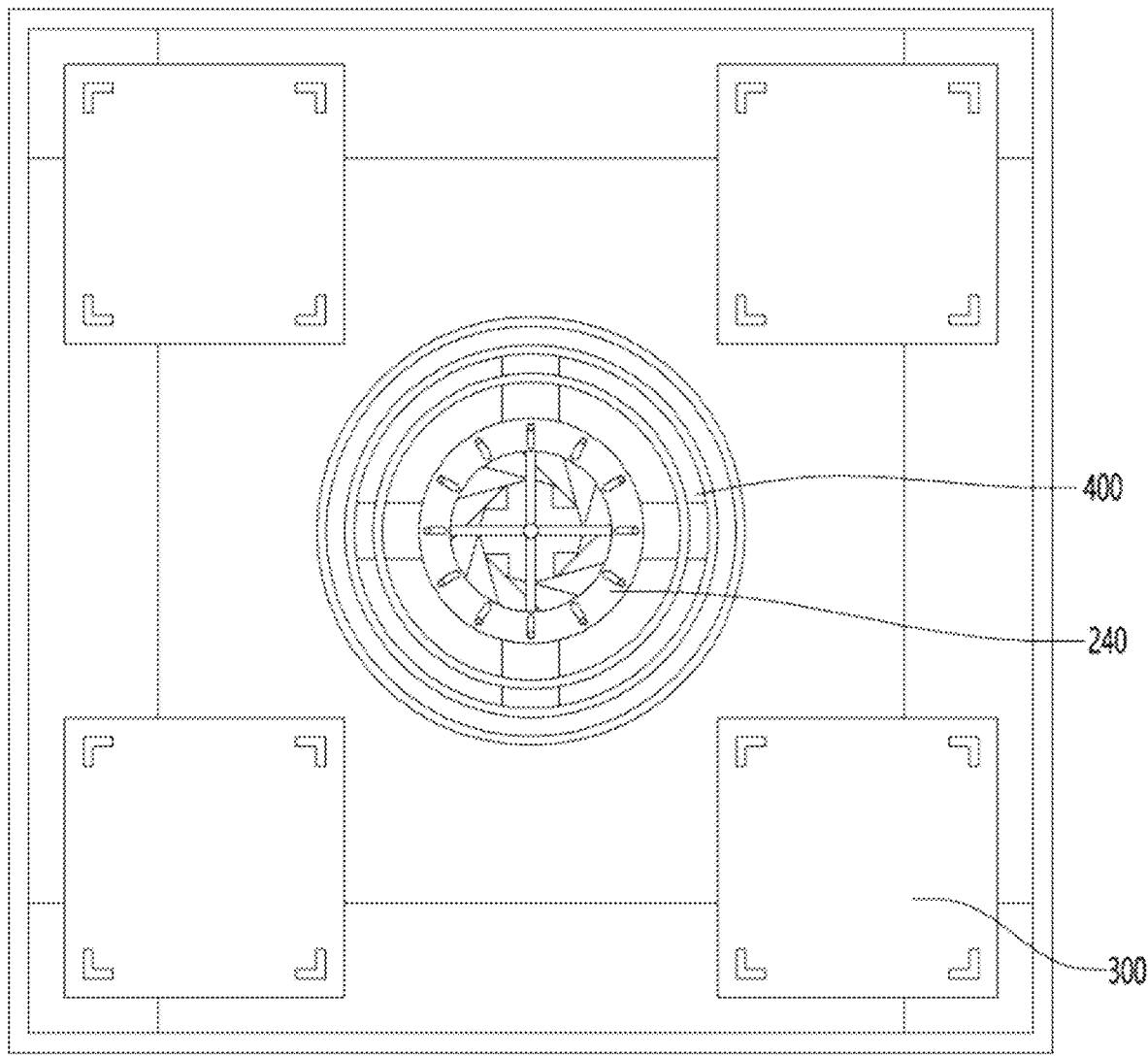
FIG. 8 is a view illustrating a layout of a central chamber part and a plurality of fuel cell stack parts according to one embodiment of the present invention.

FIG. 8 is a view illustrating the schematic structure of the fuel cell hot box and a layout of the central chamber part 200 and the plurality of fuel cell stack parts 300 according to one specific embodiment of the present invention. Referring to FIG. 8, the number of the fuel cell stack parts 300 accommodated in the first inner space 110 may be properly selected according to a performance condition required to the fuel cell hot box 10, and accommodation positions of the fuel cell stack parts 300 are accommodated may also be properly selected according to a design condition. For example, in the case in which the fuel cell stack part 300 is provided as the plurality of the fuel cell stack parts 300, the plurality of fuel cell stack parts 300 may be accommodated to be arrayed so as to be positioned at the same distance from the central chamber part 200 and spaced apart from each other by a predetermined distance. Since a large amount of heat is generated when a reaction occurs in the fuel cell stack unit 300, when accommodating a plurality of fuel cell stack units 300, each fuel cell stack unit 300 is preferably arranged to be spaced apart from each other. In addition, an axis perpendicular to the front portion of the fuel cell stack portion 300 where the air inlet is located and an axis perpendicular to the front portion of another fuel cell stack portion 300 adjacent to the fuel cell stack portion 300 may form a predetermined angle. All of the angles formed by the arranged plurality of fuel cell stack units 300 may be constant As one specific embodiment, a guide member which guides accommodation positions of the fuel cell stack parts 300 and a fixing member extending from the inner side surface of the housing 100 to fix the fuel cell stack parts 300 to the first inner space 110 may be provided in the first inner space 110. In addition, a buffer member capable of absorbing external vibration and impacts may be provided on an inner side surface at which the fuel cell stack parts 300 are in contact with the housing.

As another specific embodiment, the plurality of fuel cell stack parts 300 may be formed in one of various shapes. For example, each of the fuel cell stack parts 300 may be formed in a square hexahedron shape but is not limited thereto.

Meanwhile, the fuel cell stack parts 300 are parts in which a plurality of cells each including cathode and anode are stacked and coupled to each other. Since the fuel cell stack parts 300 according to the present invention are a stack used in a general fuel cell, a description about a detailed structure thereof will be omitted.

The air pre-heating zone 400 may form a flow path between the second inlet 130 of the housing 100 and the plurality of stack parts 300 to communicate with each other and The air-heat exchange unit 400 may be positioned between the plurality of stack units 300 and the central chamber unit 200 and form a shape in which bent flow paths are repeatedly stacked. The form of the air pre-heating zone 400 allows a heat exchange area between the plurality of fuel cell stack parts 300 and the high-temperature central chamber part 200 to increase so that heat exchange may be effectively performed. In addition, since the air pre-heating zone 400 may effectively cool the plurality of high-temperature stack parts 300, effects of improving durability and increasing lifetime of the plurality of stack parts 300 which are a core portion of the fuel cell is induced. In addition, air passing through the air pre-heating zone 400 may exchange heat with the plurality of fuel cell stack parts 300 until the air is introduced into the plurality of fuel cell stack parts 300.

FIG. 9 is a flowchart illustrating the moving paths of the fuel, air, and combustion gas according to one embodiment of the present invention. Referring to FIG. 9, when air is primarily preheated through an external heat exchanger outside the fuel cell hot box and introduced into the flow chamber 150 through the second inlet 130 by the air supply device, in the flow chamber 150 the air is secondarily preheated by high-temperature combustion gas discharged from the after burner 220. Then, the air is thirdly preheated by heat of the high-temperature fuel cell stack parts and heat of the high-temperature combustion gas and introduced into the fuel cell stack parts 300 while passing through the air pre-heating zone. When fuel is primarily preheated by the external heat exchanger outside the fuel cell hot box and introduced into the flow chamber 150 through the first inlet 120 by the fuel supply device, in the flow chamber 150 the fuel is secondarily preheated by heat of the combustion gas discharged from the after burner 220. Then, the fuel may be thirdly preheated by the high-temperature combustion gas while passing through the reformer unit 232 of the reformer 230 and the fuel heat-exchanging zone 233. In this case, the fuel is reformed at the same time so that the fuel becomes a resource usable in the fuel cell stack parts 300. The air and the reformed fuel which are introduced into the fuel cell stack parts 300 react to each other to generate water vapor, electricity, and heat, and the unreacted air and fuel pass through the fuel cell stack parts 300 and are introduced into the after burner 220. The introduced unreacted air and fuel generate high-temperature combustion gas through a combustion reaction, and the high-temperature combustion gas is distributed to the reformer 230 and a peripheral portion of the reformer 230 to preheat the fuel and air and the combustion gas may be discharged to the outlet 140 after preheating fuel and air while passing through the flow chamber 150. As described above, since air and fuel are preheated using heat of combustion gas of the after burner several times instead of directly discharging the combustion gas to the outside of the housing 100, the efficiency of a total system can be improved.

A solid oxide fuel cell hot box according to the present invention can reform fuel and preheat air and fuel at the same time using heat of a stack part and heat of combustion gas instead of using additional energy so that the efficiency of a total system can be improved.

In addition, the high-temperature fuel cell stack part which is weak to a thermal stress can be disposed to effectively exchange heat with low-temperature air so that the thermal stress of the fuel cell stack part can be reduced. Accordingly, since a reaction rate and a temperature of the fuel cell stack part can be controlled, degradation rate of durability and performance of the fuel cell stack part can be reduced to increase a lifetime.

In addition, an opening and closing system capable of selectively distributing combustion gas of an after burner for reforming of the fuel and preheating the fuel and air can be formed to control a reforming ratio of the fuel, and thus flexibility of the total system can be improved.

The present technology has been described through the embodiment as described above but is not limited thereto. The embodiment may be changed or modified without departing from the objectives and range of the present technology, and those skilled in the art will appreciate that such changes and modifications fall within the present technology.

What is claimed is:
1. A fuel cell hot box comprising:
  a housing including a first inner space, a first inlet, a second inlet, and an outlet;
  a central chamber part which is positioned in a central portion of the first inner space and includes a second inner space, an after burner, and a reformer;
  a plurality of fuel cell stack parts which are positioned at the same distance from a center of the central chamber part and are arrayed to be spaced apart from each other at predetermined intervals in the first inner space; and an air pre-heating zone provided between the plurality of fuel cell stack parts and the central chamber part, wherein, in the central chamber part, the after burner is provided at one side portion on a vertical central axis of the central chamber part, and the reformer is provided at the other side portion on the vertical central axis.

2. The fuel cell hot box of claim 1, wherein:

the first inlet is connected to the reformer;

the second inlet is connected to the air pre-heating zone; and the outlet communicates with the second inner space.

3. The fuel cell hot box of claim 1, wherein:

a through hole passing through a central portion of the reformer is formed; and a bent flow path surrounding the through hole is formed in a stacked form to allow introduced fuel to flow.

4. The fuel cell hot box of claim 3, wherein the reformer is disposed between and connects the first inlet and the plurality of fuel cell stack parts.

5. The fuel cell hot box of claim 1, wherein the reformer further includes an opening and closing unit in an upper portion of the reformer.

6. The fuel cell hot box of claim 5, wherein the opening and closing unit includes a control rod protruding outward from the housing.

7. The fuel cell hot box of claim 1, wherein the air pre-heating zone includes a bent flow path being stacked and is disposed between and connects the second inlet and the plurality of fuel cell stack parts.

* * * * *